(12) United States Patent
Hunt et al.

(10) Patent No.: US 8,032,898 B2
(45) Date of Patent: Oct. 4, 2011

(54) KERNEL INTERFACE WITH CATEGORIZED KERNEL OBJECTS

(75) Inventors: Galen C. Hunt, Bellevue, WA (US); James R. Larus, Mercer Island, WA (US); Manuel Fähndrich, Seattle, WA (US); Bjarne Steensgaard, Redmond, WA (US); David R. Tarditi, Kirkland, WA (US); Brian Zill, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 1007 days.

(21) Appl. No.: 11/428,037

(22) Filed: Jun. 30, 2006

(65) Prior Publication Data

US 2008/0005750 A1    Jan. 3, 2008

(51) Int. Cl.
  *G06F 3/00* (2006.01)
  *G06F 9/44* (2006.01)
  *G06F 9/46* (2006.01)
  *G06F 13/00* (2006.01)

(52) U.S. Cl. ...................................................... 719/319
(58) Field of Classification Search .................... 719/319
    See application file for complete search history.

(56) References Cited

U.S. PATENT DOCUMENTS

| | | | |
|---|---|---|---|
| 4,885,684 A | 12/1989 | Austin et al. | |
| 4,916,637 A | 4/1990 | Allen et al. | |
| 5,031,089 A | 7/1991 | Liu et al. | |
| 5,057,996 A * | 10/1991 | Cutler et al. | 718/106 |
| 5,179,702 A | 1/1993 | Spix et al. | |
| 5,317,568 A | 5/1994 | Bixby et al. | |
| 5,329,619 A | 7/1994 | Page et al. | |
| 5,339,443 A | 8/1994 | Lockwood | |
| 5,349,682 A | 9/1994 | Rosenberry | |
| 5,361,359 A * | 11/1994 | Tajalli et al. | 726/23 |
| 5,367,681 A | 11/1994 | Foss et al. | |
| 5,455,951 A | 10/1995 | Bolton et al. | |
| 5,469,571 A | 11/1995 | Bunnell | |
| 5,481,717 A | 1/1996 | Gaboury | |
| 5,522,075 A | 5/1996 | Robinson et al. | |
| 5,551,051 A | 8/1996 | Silverthorn et al. | |
| 5,574,911 A | 11/1996 | D'Angelo et al. | |
| 5,590,001 A | 12/1996 | Ino et al. | |
| 5,590,281 A | 12/1996 | Stevens | |
| 5,666,519 A | 9/1997 | Hayden | |
| 5,694,601 A | 12/1997 | White | |
| 5,737,605 A | 4/1998 | Cunningham et al. | |

(Continued)

FOREIGN PATENT DOCUMENTS

CN    1549108 A    11/2004

(Continued)

OTHER PUBLICATIONS

Acharya et al, "MAPbox: Using Parameterized Behavior Classes to Confine Applications", 1999, University of California, Santa Barbera, pp. 1-19.*

(Continued)

*Primary Examiner* — Andy Ho
*Assistant Examiner* — Timothy A Mudrick
(74) *Attorney, Agent, or Firm* — Lee & Hayes, PLLC (57) ABSTRACT

Described herein are one or more implementations that separate kernel interfaces functions into those that act on kernel objects owned by a process and accessed exclusively by that process—described herein as local kernel objects—from access to kernel objects owned by a process and accessible by other active processes.

14 Claims, 3 Drawing Sheets

U.S. PATENT DOCUMENTS

| | | | |
|---|---|---|---|
| 5,752,032 A | 5/1998 | Keller et al. |
| 5,768,532 A | 6/1998 | Megerian |
| 5,794,052 A | 8/1998 | Harding |
| 5,845,129 A | 12/1998 | Wendorf et al. |
| 5,857,195 A | 1/1999 | Hayashi et al. |
| 5,878,408 A | 3/1999 | Van Huben et al. |
| 5,923,878 A | 7/1999 | Marsland |
| 5,931,938 A | 8/1999 | Drogichen et al. |
| 5,938,723 A | 8/1999 | Hales, II et al. |
| 5,958,050 A | 9/1999 | Griffin et al. |
| 5,963,743 A | 10/1999 | Amberg et al. |
| 5,974,572 A | 10/1999 | Weinberg et al. |
| 5,991,518 A | 11/1999 | Jardine et al. |
| 6,003,129 A | 12/1999 | Song et al. |
| 6,006,328 A | 12/1999 | Drake |
| 6,009,476 A | 12/1999 | Flory et al. |
| 6,038,399 A | 3/2000 | Fisher et al. |
| 6,066,182 A | 5/2000 | Wilde et al. |
| 6,072,953 A | 6/2000 | Cohen et al. |
| 6,078,744 A | 6/2000 | Wolczko et al. |
| 6,080,207 A | 6/2000 | Kroening et al. |
| 6,092,189 A | 7/2000 | Fisher et al. |
| 6,115,819 A | 9/2000 | Anderson |
| 6,144,992 A | 11/2000 | Turpin et al. |
| 6,157,928 A | 12/2000 | Sprenger et al. |
| 6,161,051 A | 12/2000 | Hafemann et al. |
| 6,182,275 B1 | 1/2001 | Beelitz et al. |
| 6,202,147 B1 | 3/2001 | Slaughter et al. |
| 6,247,128 B1 | 6/2001 | Fisher et al. |
| 6,279,111 B1 * | 8/2001 | Jensenworth et al. ........... 726/10 |
| 6,292,941 B1 | 9/2001 | Jollands |
| 6,321,334 B1 | 11/2001 | Jerger et al. |
| 6,324,622 B1 | 11/2001 | Okpisz et al. |
| 6,341,371 B1 | 1/2002 | Tandri |
| 6,351,850 B1 | 2/2002 | van Gilluwe et al. |
| 6,381,742 B2 | 4/2002 | Forbes et al. |
| 6,405,361 B1 | 6/2002 | Broy et al. |
| 6,434,694 B1 | 8/2002 | Slaughter et al. |
| 6,438,549 B1 * | 8/2002 | Aldred et al. ................. 707/640 |
| 6,442,754 B1 | 8/2002 | Curtis |
| 6,446,260 B1 | 9/2002 | Wilde et al. |
| 6,487,723 B1 | 11/2002 | MacInnis |
| 6,542,926 B2 | 4/2003 | Zalewski et al. |
| 6,546,546 B1 | 4/2003 | Van Doorn |
| 6,629,152 B2 | 9/2003 | Kingsbury et al. |
| 6,658,447 B2 | 12/2003 | Cota-Robles |
| 6,715,144 B2 | 3/2004 | Daynes et al. |
| 6,732,220 B2 | 5/2004 | Babaian et al. |
| 6,748,592 B1 | 6/2004 | Porter |
| 6,816,905 B1 | 11/2004 | Sheets et al. |
| 6,817,013 B2 | 11/2004 | Tabata et al. |
| 6,842,782 B1 | 1/2005 | Malik et al. |
| 6,868,539 B1 | 3/2005 | Travison et al. |
| 6,912,692 B1 | 6/2005 | Pappas |
| 6,944,754 B2 | 9/2005 | Zilles et al. |
| 6,973,517 B1 | 12/2005 | Golden et al. |
| 6,977,994 B2 | 12/2005 | Stephenson et al. |
| 6,988,261 B2 | 1/2006 | Sokolov et al. |
| 7,000,092 B2 | 2/2006 | Gehman et al. |
| 7,062,764 B2 | 6/2006 | Cohen et al. |
| 7,086,056 B2 | 8/2006 | Fukushima |
| 7,089,289 B1 | 8/2006 | Blackmore et al. |
| 7,155,713 B1 | 12/2006 | Burkhardt et al. |
| 7,167,867 B1 | 1/2007 | Rago |
| 7,222,106 B2 | 5/2007 | Block et al. |
| 7,222,341 B2 | 5/2007 | Forbes et al. |
| 7,278,030 B1 | 10/2007 | Chen et al. |
| 7,451,435 B2 | 11/2008 | Hunt et al. |
| 7,454,477 B2 | 11/2008 | Talluri et al. |
| 7,484,245 B1 | 1/2009 | Friedman et al. |
| 7,600,232 B2 | 10/2009 | Hunt et al. |
| 7,882,317 B2 | 2/2011 | Hunt et al. |
| 2001/0029605 A1 | 10/2001 | Forbes et al. |
| 2002/0004852 A1 | 1/2002 | Sadovsky et al. |
| 2002/0099954 A1 | 7/2002 | Kedma et al. |
| 2002/0100017 A1 | 7/2002 | Grier et al. |
| 2003/0031404 A1 | 2/2003 | Pedersen |
| 2003/0056084 A1 | 3/2003 | Holgate et al. |
| 2003/0061067 A1 | 3/2003 | Atwal et al. |
| 2003/0061404 A1 | 3/2003 | Atwal et al. |
| 2003/0084256 A1 | 5/2003 | McKee |
| 2003/0097581 A1 | 5/2003 | Zimmer |
| 2003/0130854 A1 | 7/2003 | Galanes et al. |
| 2003/0191867 A1 | 10/2003 | Czajkowski |
| 2003/0200402 A1 | 10/2003 | Willman et al. |
| 2003/0212990 A1 | 11/2003 | Brodkorb et al. |
| 2003/0221012 A1 | 11/2003 | Herrmann et al. |
| 2003/0233644 A1 | 12/2003 | Cohen et al. |
| 2004/0025016 A1 * | 2/2004 | Focke et al. ................... 713/164 |
| 2004/0034850 A1 | 2/2004 | Burkhardt et al. |
| 2004/0061067 A1 | 4/2004 | Clauss |
| 2004/0064736 A1 | 4/2004 | Obrecht et al. |
| 2004/0078799 A1 | 4/2004 | Koning et al. |
| 2004/0123273 A1 | 6/2004 | Hammerich et al. |
| 2004/0153991 A1 | 8/2004 | Chen et al. |
| 2004/0187096 A1 | 9/2004 | Dumont |
| 2004/0193819 A1 * | 9/2004 | Marinescu et al. ........... 711/165 |
| 2004/0199763 A1 | 10/2004 | Freund |
| 2004/0226023 A1 | 11/2004 | Tucker |
| 2004/0236861 A1 | 11/2004 | Bondar et al. |
| 2004/0268171 A1 | 12/2004 | Inoue et al. |
| 2005/0005261 A1 | 1/2005 | Severin |
| 2005/0021537 A1 | 1/2005 | Brendle et al. |
| 2005/0050069 A1 | 3/2005 | Vaschillo et al. |
| 2005/0060687 A1 | 3/2005 | Ghazaleh et al. |
| 2005/0071592 A1 | 3/2005 | DeCaro |
| 2005/0071828 A1 | 3/2005 | Brokenshire et al. |
| 2005/0081181 A1 | 4/2005 | Brokenshire et al. |
| 2005/0081203 A1 | 4/2005 | Aguilar et al. |
| 2005/0091658 A1 | 4/2005 | Kavalam et al. |
| 2005/0119902 A1 * | 6/2005 | Christiansen ..................... 705/1 |
| 2005/0125789 A1 | 6/2005 | Dijkstra et al. |
| 2005/0188372 A1 | 8/2005 | Inoue et al. |
| 2005/0203988 A1 | 9/2005 | Nollet et al. |
| 2005/0223239 A1 * | 10/2005 | Dotan .......................... 713/188 |
| 2005/0246718 A1 | 11/2005 | Erlingsson et al. |
| 2006/0005082 A1 | 1/2006 | Fossum et al. |
| 2006/0031815 A1 | 2/2006 | Bhagia et al. |
| 2006/0047875 A1 | 3/2006 | Aguilar et al. |
| 2006/0069692 A1 | 3/2006 | Pernia |
| 2006/0085789 A1 | 4/2006 | Laborczfalvi et al. |
| 2006/0123401 A1 | 6/2006 | O'Brien et al. |
| 2006/0123417 A1 | 6/2006 | Hunt et al. |
| 2007/0011199 A1 | 1/2007 | Hunt et al. |
| 2007/0033592 A1 | 2/2007 | Roediger et al. |
| 2007/0043936 A1 | 2/2007 | Day et al. |
| 2007/0061483 A1 | 3/2007 | Dauger |
| 2007/0094495 A1 | 4/2007 | Hunt et al. |
| 2007/0094673 A1 | 4/2007 | Hunt et al. |
| 2007/0256080 A1 * | 11/2007 | Smith et al. ................... 719/313 |
| 2007/0283337 A1 | 12/2007 | Kasahara et al. |
| 2008/0022278 A1 | 1/2008 | Gschwind et al. |
| 2008/0244507 A1 | 10/2008 | Hodson et al. |
| 2008/0250414 A1 | 10/2008 | Brokenshire et al. |

FOREIGN PATENT DOCUMENTS

| | | |
|---|---|---|
| EP | 1033648 A2 | 9/2000 |
| EP | 1443398 A | 8/2004 |
| JP | 2002506247 | 2/2002 |
| JP | 2003233521 | 8/2003 |
| JP | 2004513412 | 4/2004 |
| KR | 20010007119 | 1/2001 |
| RU | 2307388(C2) | 9/2007 |
| RU | 2337398(C2) | 10/2008 |
| WO | WO02093370 A | 11/2002 |
| WO | WO03038599 A2 | 5/2003 |
| WO | WO2004025491(A1) | 3/2004 |
| WO | WO2004099949(A1) | 11/2004 |

OTHER PUBLICATIONS

Niels Provos, "Improving Host Security with System Call Policies", 2003, Proceedings of the 12th USENIX Security Symposium, pp. 257-271.*

Scope, "Variable Scope", 2003, pp. 1-5.*

Kurchuk et al, "Recursive Sandboxes: Extending Systrace to Empower Applications", 2004, pp. 1-16.*

Perrine et al., "An Overview of the Kernelized Secure Operating System (KSOS)", 1984, Proceedings of the 7th DoD/NBS Computer Security Conference, pp. 0-14.*

Tom Perrine, The Kernelized Secure Operating System (KSOS), 2002, ;login: The Magazine of USENIX & SAGE, vol. 27, No. 6, pp. 36-40.*

Andre Tost, "Loosely typed versus strongly typed Web services", Sep. 2, 2005, IBM, pp. 1-14.*

Hunt et al: "Broad New OS Research: Challenges and Opportunities" Retrieved from the Internet: URL:http://research.microsoft.com/os/singularity/publications/ hotos2005_broadnewreseach.pdf> [retrieved on Dec. 2, 2008].

Mikunov A., " Rewrite MSil Code on the Fly with the.NET Framework Profiling API", MSDN Magazine (Online) Sep. 2003, Retrieved from the Internet: URL: <<http://msdn.microsoft.com/en-us/magazine/cc188743 (printer).aspx>> retrieved on Dec. 12, 2008).

Tatsubori et al: "Open Java: A Class-Based Macro System for Java" 2000 [Retrieved from the Internet: URL: http://www.springerlink.com/content/n64gdultayqfmcjc/fulltext.pdf> retrieved on Dec. 2, 2008].

Bogojevic, et al., "The Architecture of Massive Multiplayer Online Games", retrieved on Feb. 25, 2009 at <<http://graphics. cs.lth.se/theses/projects/mmogarch/som.pdf>>, Department of Computer Science, Lund University, Sep. 8, 2003, Chapter 4, 11 pages.

Watson, et al., "Design and implementation of the Trusted BSD MAC framework", Proceedings of 2003 DARPA Information Survivability Conference and Exposition, Sec. 1&5-7, Apr. 2003, pp. 38-49.

"The JX Operating System" Michael Golm, Meik Felser Christian Wawersich, and Juergen Kleinoeder 2002 USENIX Annual Technical Conference, Jun. 10-15, 2002, Monterey, CA, pp. 45-58.

"Trademark Electronic Search System (TESS) from the USPTO database" for "WINDOWS" trademark of Microsoft filed in USPTO Aug. 20, 1999; http://tess2.uspto.gov/bin/gate.exe? f=doc &state=n00gan.5.26.

Microsoft Press Computer Dictionary, Second Edition, 1994, Published by Penguin Books, Ltd., pp. 23-24 and p. 279.

Microsoft Press Computer Dictionary Third Edition: 1997 3 pages.

Pike, et al., "Plan 9 from Bell Labe".

Pike, et al, "The Use of Name Spaces in Plan 9", Operating Systems Review, vol. 27, #2, Apr. 1993, pp. 72-76.

Fraim, "Scomp: A Solution to the Multilevel Security Problem", IEEE, 1983, pp. 26-34.

Back et al., "Processes in KaffeOS: Isolation, Resource Management, and Sharing in Java", Proceedings of the 4th USENIX Symposium, Dec. 6, 2004, pp. 333-pp. 346.

Hunt et al., "Singularity Technical Report 1: Singularity Design Motivation", Microsoft Research, 2004 Microsoft Corporation, pp. 1-pp. 4 .

McNamee et al., "An Attribute Grammar Approach to Compiler Optimization of Intra-Module Interprocess Communication", International Journal of Parallel Programming, vol. 20, Nov. 3, 1991, pp. 181-pp. 202 .

Tanenbaum, "Modern Operating Systems", Prentice Hall Inc., 2001, pp. 168-pp. 175.

Chaki et al, "Types as Models: Model Checking Message-Passing Programs", Proceedings of the 29th ACM Symposium on Principles of Programing Lanuages, 2002, pp. 45-pp. 57 .

Acceta et al.; "A New Kernel Foundation for UNIX Development", In Summer USENIX Conference, Atlanta, GA, Jun. 1986, pp. 93-112.

Back et al.; "Processes in KaffeOS: Isolation, Resources Management, and Sharing in Java"; In Proceedings of the 4th USENIX Symposium on Operating Systems Design & Implementation (OSDI), San Diego, CA, Oct. 2000.

Dorward et al; "The Inferno Operating System"; Bell Labs Technical Journal, 2 (1), Winter 1997, pp. 5-18.

Engler et al.; "Exokernel: an Operating System Architecture for Application-Level Resource Management"; In Proceedings of the Fifteenth ACM Symposium on Operating System Principles, Cooper Mountain Resort, Co, 1995, pp. 251-266.

Goldberg et al.; "Smalltalk-80: The Language and Its Implementation"; Addison-Wesley, May 1983.

Golm et al.; "The JX Operating System"; In Proceedings of the USENIX 2002 Annual Conference, Monterey, CA, Jun. 2002, pp. 45-58.

Hartig et al.; "The Perfromance of u-kernel-based Systems"; In Proceedings of the Sixteenth ACM Symposium on Operating Systems Principles (SOSP '97), Saing Malo, France, 1997, pp. 66-77.

Hawblitzel et al.; "Implementing Multiple PRotection Domains in Java"; In Proceedings of the 1998 USENIX Annual Technical Conference, New Orleans, LA, Dec. 1998, pp. 259-270.

Hawblitzel et al.; "Luna: A Flexible Java Protection System"; In Proceedings of the Fifth ACM Symposium on Operating System Design and Implementation (OSDI'02), Boston, MA, 2002, pp. 391-402.

"JSR-000121 Application Isolation API Specification"; available at http://jcp.org/aboutJava/communityprocess/pfd/ jsr121/index.html; printed Sep. 7, 2006, 1 page.

"JSR 121: Application Isolation API Specification" Java Specification Requests, printed Sep. 7, 2006, 7 pages.

Rajamani et al.; "Conformance Checking for Models of Asynchronous Message Passign Software"; In Proceedings of the International Conference on Computer Aided Verification (CAV 02), Springer, Copenhagen, Denmark, Jul. 2002, pp. 166-179.

Redell et al.; "Pilot: An Operating System for a Personal Computer"; Communications of the ACM, 23 (2), 1980, pp. 81-92.

Rosenblum et al.; "The Impact of Architectural Trends on Operating System Performance"; In Proceedings of the Fifteenth ACM Symposium on Operating System Principles, Copper Mountain Resort, CO, 1995, pp. 285-298.

Swift et al; "Improving the Reliability of Commodity Operating Systems"; In Proceedings of the 19th ACM Symposium on Operating Systems Principles (SOSP '03), Bolton Landing, NY, 2003, pp. 207-222.

Swinehart et al.; "A Structural View of the Cedar Programming Environment"; ACM Transactions on Programming Languages and Systems, 8 (4), 1986, pp. 419-490.

Wahbe et al.; "Efficient Software-Based FAult Isolation"; In Proceedings of the Fourteenth ACM Symposium on Operating System Principles, Asheville, NC, 1993, pp. 203-216.

Weinreb et al.; "Lisp Machine Manuel"; Symbolics, Inc., Cambridge, MA, Jul. 1981.

Wood et al.; "An In-Cache Address Translation Mechanism"; In Proceedings of the Thirteenth Annual International Symposium on Computer Architecture, Jun. 1986, pp. 158-166.

Golm et al., "Beyond Address Spaces- Flexibility, Performance, Protection, and Resource Management in the Type-Safe JX Operating System", Proc. of the 8th Workshop on Hot Topics in Operating Systems, May 2001, pp. 1-pp. 6 .

Berman, et al., "Application-Level Scheduling on Distributed Heterogeneous Networks (Technical Paper)", available at least as early as Mar. 6, 2007, at <<http://citeseer.ist.psu.edu/cache/papers/cs/30161/http:zSzzSzwww-cse.ucsd.eduzSz~gshaozSzpaperszSzsup96.pdf/application-level-scheduling-on.pdf>>, pp. 1-29.

Gay et al., "Session Types for Inter-Process Communication", University of Glasgow, Department of Computing Science Technical Report (TR-2003-133), Mar. 2003, 33 pages.

Huang et al., "Securing Web Application Code by Static Analysis and Runtime Protection", Proceedings of the 13th International Conference on World Wide Web, ACM, New York, NY, May 2004, pp. 40-51.

Khokhar, et al., "Heterogeneous Computing: Challenges and Opportunities", available at least as early as Mar. 6, 2007, at <<http://meseec.ce.rit.edu/eecc722-fall2002/papers/hc/1/r6018.pdf>>, IEEE, Jun. 1993, pp. 18-27.

Lyonnard, et al., "Automatic Generation of Application-Specific Architectures for Heterogeneous Multiprocessor System-on-Chip", available at least as early as Mar. 6, 2007, at <<http://delivery.acm.org/10.1145/380000/379015/p518-lyonnard.pdf?key1=379015 &key2=7123613711&coll=GUIDE&dl=GUIDE &CFID=16158147&CFTOKEN=58686892>>, ACM, Jun. 2001, pp. 518-523.

Sun, et al., "Synthesis of Application-Specific Heterogeneous Multiprocessor Architectures using Extensible Processors", Proceedings of the 18th International Conference on VLSI Design held jointly with 4th International Conference on Embedded System Design (VLSID '05), Jan. 2005, 6 pages.

U.S. Appl. No. 60/692,190 entitled "Secure and Stable Hosting of Third-Party Extension to Web Services", Hunt et al, filed on Jun. 20, 2005.

U.S. Appl. No. 60/730,546 entitled "Programming Language Support for Software Isolation Processes (SIPs) and Isolated Extensions and Device Drivers Based Upon SIPs," Hunt et al, filed on Oct. 26, 2005.

Russian Office Action mailed Apr. 18, 2011 for Russian Patent Application No. 2008116714, a counterpart foreign application of U.S. Appl. No. 11/428,096.

Chinese Office Action mailed May 19, 2011 for Chinese Patent Application No. 200680040116.1, a counterpart foreign application of U.S. Appl. No. 11/428,096, 10 pages.

Japanese Office Action mailed May 24, 2011 for Japanese Patent Application No. 2005-354079, a counterpart foreign application of US Patent No. 7,451,435, 4 pages.

Office Action for U.S. Appl. No. 11/694,455, mailed on Aug. 17, 2011, Orion Hodson, "Homogeneous Programming For Heterogeneous Multiprocessor Systems", 11 pgs.

Final Office Action for U.S. Appl. No. 11/694,339, mailed on Aug. 3, 2011, Orion Hodson, "Master and Subordinate Operating System Kernels for Heterogeneous Multiprocessor Systems", 12 pages.

* cited by examiner

KERNEL INTERFACE WITH CATEGORIZED KERNEL OBJECTS

BACKGROUND

A kernel interface is a low-level communication bridge between a process and the kernel of an operating system. The kernel interface typically includes entry points where a process' execution enters the kernel and calling conventions, which control how function arguments are passed to the kernel and how return values are retrieved.

The kernel interface of a typical operating system may include functions to start and stop threads of execution, to synchronize threads of execution, to read and write data from files, to enlist in regions of shared memory, to draw on a screen, to communicate with a network, or to read a system clock. Kernel interfaces can range from dozens of entry points to hundreds and even thousands of entry points.

A kernel interface is one component of the operating system's application programming interface (API) presented to programmers. An API typically defines the interface between an application programmer's source code and operating system libraries so that the same source code will compile on any system supporting the API. Many conventional operating systems encapsulate the kernel interface within a higher-level API because the kernel interface varies from version to version of the kernel.

For example, to insulate application programmers from changes in the kernel of the Microsoft® Windows® XP brand operating system, the kernel interface of that operating system is hidden behind the Win32® API and not published. In the case of the Microsoft® Windows® XP brand operating system, programs are dynamically linked to the libraries of the Win32® API at load time.

On the other hand, a conventional kernel interface allows processor-executable instructions to function without changes on any system using the same or compatible kernel interface. From a security perspective, the processor-executable instructions of the conventional kernel interface are secure from tampering as they reside within the protection domain of the operating system kernel. On the other hand, the processor-executable instructions of the conventional high-level API may not be secure from tampering as they execute within the context of the process.

A common characteristic of conventional operating system kernel interfaces is that they use an access control pattern to decide which operations may be performed by a process through the kernel interface. With an access control pattern each "kernel object"—such as a thread, open file, or user interface windows—has an access control list that specifies which security principals are allowed to perform a specific action (or set of actions) on the kernel object. Kernel objects are abstractions provided by the kernel. Kernel objects are the things that an application affects through the kernel interface. Examples of kernel objects in the Microsoft® Windows® XP brand OS are "open files", "windows", "threads of execution", "shared memory mappings", etc.

Security principals (i.e., "security ids") are the unit of identifying a party for security purposes. For example, on Unix, each user is a security principal with their own unique user id. Security principals are not always users. For example, the Microsoft® Windows® XP brand OS has a "network logon" principal that is used to run services that communicate over the network. As security principals typically have a one-to-one correspondence with users, each process typically has one associated security principal.

Metaphorically, an access control list is like guest list at private gathering, only processes on the list are allowed to use the kernel object. Because a running kernel may have thousands or tens of thousands of objects—such as threads, open files, and user interface windows—and dozens or hundreds of security principals, the access control lists of kernel can become unmanageable. Incorrectly set access control lists on kernel objects are a common source of security vulnerabilities in conventional operating systems.

To avoid the complexities of managing access control lists, other operating systems employ a capability pattern to control which operations may be performed by a process through the kernel interface. With a capability pattern, a "capability" represents the right to perform a specific action on a specific kernel object. The capability can be shared from one process to another to grant access to the kernel object. Metaphorically, a capability is like a key to a door, any process holding a capability can access the object that the capability unlocks. The complexities of tracking potentially hundreds of capabilities within a single process can quickly lead to security vulnerabilities in which a capability is accidentally leaked to another process. Furthermore, like a key, it is extremely difficult to get back a key once it has been lent out or lost.

SUMMARY

Described herein are one or more implementations that separate kernel interfaces functions into those that act on kernel objects owned by a process and accessed exclusively by that process—described herein as local kernel objects—from access to kernel objects owned by a process and accessible_by other active processes—described herein as peer kernel objects. One or more implementations further prevent, by rigorous omission, the conversion of local kernel object identifiers into peer kernel object identifiers. By construction of a distinct type of identifier for local kernel objects, one or more implementations described prevent a calling process from inadvertently or maliciously directing the kernel to perform functions that alter the in-process data of peer processes.

Furthermore, with one or more implementations described, a calling process is allowed to—via a kernel interface call—to spawn a new child process, but it cannot alter the in-process data of that child process once the child is executing. The construction allows program verification tools, including compilers, to catch inadvertent or malicious attempts to alter the in-process data of another process This summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

The same numbers are used throughout the drawings to reference like elements and features.

DETAILED DESCRIPTION

The following description sets forth one or more implementations of an interface between processes and a kernel of an operating system. More specifically, the one or more implementations described are a kernel interface or some component (e.g., a process or kernel) that communicates or uses the kernel interface. More particularly, one or more implementations described restrict and separate the kernel operation a calling process may request for local kernel objects from those a process may request for peer kernel objects. By this construction, one or more implementations describe prevent a calling process from directing the kernel to perform functions—via a kernel interface call—that directly alter the state of other processes.

The following co-pending patent applications (which are commonly owned by the same assignee as this application) are incorporated herein by reference:

U.S. patent application Ser. No. 11/005,562, which was filed on Dec. 6, 2004 and is titled "Operating-System Process Construction."Herein, the application is called the "Operating-System Process Construction." The application provides details on the creation of isolated processes.

U.S. patent application Ser. No. 11/007,655, which was filed on Dec. 7, 2004 and is titled "Inter-Process Communications Employing Bi-directional Message Conduits." Herein, the application is called the "Inter-Process Communications Employing Bi-directional Message Conduits." The application provides details regarding inter-process communication between isolated processes.

U.S. patent application Ser. No. 11/007,808, which was filed on Dec. 7, 2004 and is titled "Self-Describing Artifacts and Application Abstractions." Herein, the application is called the "Self-Describing Artifacts and Application Abstractions." The application provides details regarding the creation of an application, which includes one or more isolated processes.

Cateogorized Kernel Objects

An operating system's security architecture often seek to guarantee that a process can access only appropriate kernel objects and that a process can execute without corruption from a second process. However, years of practical experience suggest that both access-control systems and capability systems seldom achieve these guarantees.

A kernel interface function operates on kernel objects. As expressed herein, kernel objects are divided into two categories based upon how kernel interface functions operate on them:

A "local" kernel object is a kernel object owned by a particular process and accessed exclusively by that process. A "local" kernel object is an object created just for the purpose of being used by a particular process. As used herein, a "local" kernel object is for "internal use only."

A "peer" kernel object is a kernel object owned by a particular process but is accessible by other active processes. A "peer" kernel object is an object created for use by a particular process and is available for use its peer processes. A "peer" process is any other active process on the computer system. As used herein, a "peer" kernel object is for either internal or external use.

One reason both access control and capability systems so often fail to provide adequate security is because they allow a process to indiscriminately mix the ability to access its own "local" kernel objects with "peer" kernel objects, which are owned by peer processes. For example, as long as a process has appropriate security privileges, a conventional kernel interface does not discriminate between the process halting a local thread of execution and halting a peer thread of execution.

To understand why, consider the conventional kernel interface. The kernel interfaces exposes kernel objects through kernel-object identifiers, known variously as a handle, descriptor, port, or capability. When a process calls an entry point in the kernel interface, it provides the kernel-object identifier of the kernel object to be affected. For example, to halt a thread of execution, a process might call a TerminateThread entry point in the kernel interface giving the thread's identifier as an argument.

A drawback with conventional access-control and capability kernel interfaces is that they do not distinguish between kernel-object identifiers of local kernel objects, those owned by a process, and kernel-object identifiers of peer kernel objects, those owned by another process.

Because all local and peer identifiers are structurally identical in conventional kernel interfaces and because a process can acquire identifiers of peer objects, such as peer threads, the TerminateThread call of a conventional approach will let a process indiscriminately terminate not only local threads of executions, but those of a second process as well. Accidental or malicious misuse of identifiers is quite common in practice because the same peer identifier can often be used to synchronize with a thread of execution in a second process (a benign operation) or to halt it (a destructive operation).

The lack of discrimination between local and peer kernel object identifiers in kernel interfaces is common across all conventional operation systems. It is also pervasive within the entry points of a given kernel interface. Most conventional OSs do not distinguish between local and peer kernel-object identifiers.

However, one or more implementations, described herein, do distinguish between categories of kernel-object identifiers. In particular, it classifies them as "local" and "peer" kernel-object identifiers.

Exemplary OS Architecture

Figure 1:
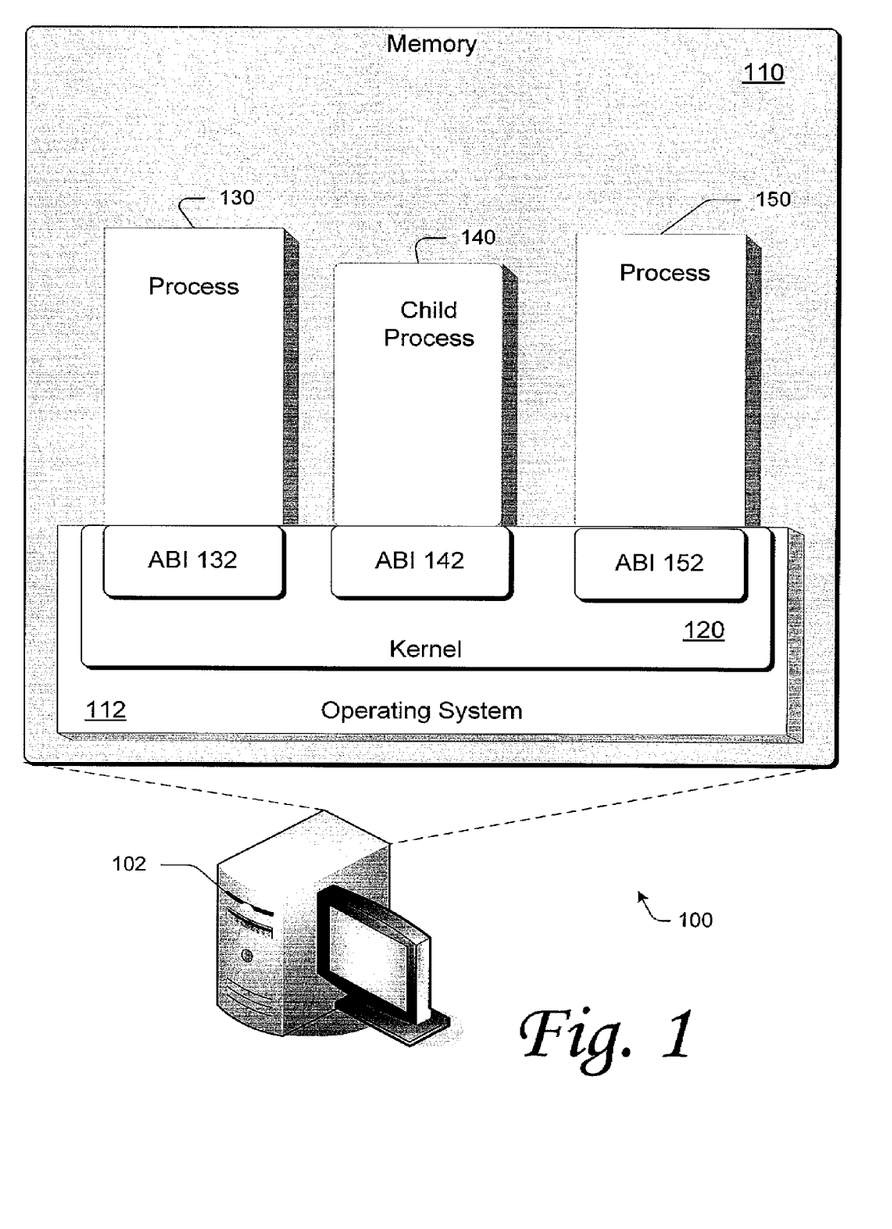
FIG. 1 is an operational scenario for an operating system architecture that supports one or more implementations described herein.

FIG. 1 illustrates an exemplary OS architecture 100 suitable to accommodate one or more of the implementations described herein. An exemplary kernel interface is part of that architecture. The kernel interface describes a low-level communication bridge between processes and the kernel.

As depicted in FIG. 1, the exemplary OS architecture 100 is implemented on a computer 102. The computer 102 typically includes a variety of processor-readable media, including a memory 110. Such media may include any available media accessible by the computer 102 and include both volatile and non-volatile media, removable and non-removable media.

An OS 112 is shown stored in the memory 110 and is executed on the computer 102. OS 112 has a kernel 120. Generally, a kernel (such as kernel 120) is the central and privileged module of an OS that provides essential services required by other parts of the OS, processes, and applications. Typically, the kernel is responsible for input/output management, memory management (e.g., allocating and reclaiming memory), process and task management (e.g., creating and scheduling threads and providing intraprocess thread synchronization), and managing access to hardware resources.

FIG. 1 shows, for example, three active software processes (130, 140, and 150) running in the memory 110. More specifically, process 140 is a child of process 130. This hierarchical relationship means that parent process 130 spawns child process 140. Consequently, the parent often influences the composition and attributes of the child. Typically, a child process inherits some properties from its parent process.

In the realm of computer science and, more particularly, in the art of OSs, the term "software process" (or more simply, "process") is well known. Execution of a program occurs within one or more processes. Operating systems typically associate memory resources, execution resources, and one or more security identities with a process. The OS is aware of and, indeed, may manage and supervise one or more separate processes running on a computer.

As depicted in FIG. 1, each of the three active software processes (130, 140, and 150) interact with the kernel 120 through a kernel interface. FIG. 1 shows the kernel interface 132 connecting process 130 and the kernel 120, kernel interface 142 connecting child process 140 and the kernel, and kernel interface 152 connecting process 150 and the kernel. Strictly speaking, kernel interface 132 is the kernel interface definition and the executable instructions inside the kernel are the kernel interface.

In some implementations, all kernel interfaces use the same processor-executable instructions. In other implementations, kernel interfaces use different processor-executable instructions which provide different functionality based on the version of the kernel interface definition used to build the application.

With one or more implementations, the software processes (such as 130, 140, and 150) employ inter-process communication. With this, processes communicate with each other by exchanging messages through bi-directional, strongly typed, higher-order channels. A channel is strongly typed by a computer-readable channel contract, which specifies various characteristics of the channel, including specifying permissions on the message sent across the channel. The "Inter-Process Communications Employing Bi-directional Message Conduits" (referenced above) discloses additional details regarding the inter-process communication.

In addition to the mechanism of message-passing channels, processes communicate with the kernel through the kernel interface entry points (such as 132, 142, and 152) that invokes kernel interface functions in kernel code. This interface helps isolates the kernel and process spaces. With one or more implementations, the parameters to this kernel interface are values, rather than pointers, so that kernel and processes' garbage collectors need not coordinate.

In one or more implementations, the kernel interface includes one set of functions that operate on local kernel objects, which are objects created for use solely by the process, and another set of functions that operate on peer kernel objects, which are objects create for use by the process or peer processes. One or more implementations further include execution thread objects, thread synchronization objects, or memory objects for processing heap in the set of local objects, but do not include those same objects in the set of peer objects. One or more implementations include inter-process communication objects in the set of peer objects.

At least one implementation kernel interface functions maintain a system-wide state isolation invariant between processes. A process cannot alter the state of any other process through the kernel interface. In other words, the kernel interface calls affect only the state of the calling process (in at least one implementation).

Exemplary Kernel Interface

Using the exemplary OS architecture 100, processes (such as processes 130, 140, and 150) communicate with the kernel via their exemplary kernel interface (such as kernel interface 132, 142, and 152). The exemplary kernel interface described herein allows the process to call the kernel to perform actions on some kernel object.

The exemplary kernel interfaces separates kernel objects into two categories: local kernel objects, which are created for exclusive use of the local process, and peer kernel objects, which are create for use within the local process or by peer processes. The exemplary kernel interfaces includes functions that can act only on local kernel objects and functions that can act only on peer kernel objects. Examples of local kernel objects in the exemplary kernel interface include (but are not limited to):

threads of execution within the calling process,
thread synchronization objects available to threads within the calling process,
objects for activating and terminating child processes,
objects for identifying the local process and peer processes,
pages of memory used for garbage-collected memory within the calling process,
stack segments for threads executing within the calling process, and
objects for accessing process configuration parameters.

Examples of peer kernel objects in the exemplary kernel interface include (but are not limited to):

message content containers (for inter-process communication via channels), and
inter-process communication channels.

Examples of functions in the exemplary kernel interface that act only on local kernel objects include (but are not limited to):

creating and manipulating threads within the calling process,
creating and using thread synchronization objects available to threads within the calling process,
activating and terminating child processes,
securely acquiring the local kernel object identifying another process accessed through an inter-process communication channel,
allocating and freeing memory used for garbage-collection memory within the calling process,
growing and shrinking thread stack segments,
accessing process configuration parameters, and
terminating the calling process when it completes.

Examples of functions exemplary kernel interface that act only on peer kernel objects include (but are not limited to):

creating and manipulating message content (for inter-process communication via channels), and
sending and receiving messages via inter-process communication channels.

Because conventional kernel interfaces know of no distinction between local and peer kernel objects, they expose processes to both accidental and malicious misuse of kernel objects. This misuse can allow a first process to alter or corrupt the state of a second process.

Fortunately, with one or more implementations described herein, a calling process is restricted through the separate of kernel objects into local and peer objects as to the function it may direct the kernel to perform. By separating different type of kernel objects into distinct local and peer object categories, one or more implementations described herein prevent a first process from either accidentally or maliciously altering or corrupting the in-process data of a second process.

Because the exemplary kernel interface separates specific types of kernel objects into either local or peer object categories, static analysis tools, such as compilers or program verifiers, can easily check the instructions of statically typed programs to verify that it will not attempt, either accidentally or maliciously, to alter the in-process data of a second program. The verification step is to read the instructions of the first program, identify the type of each kernel object identifier used in the program, identify each kernel interface call in the first program, and verify that each kernel interface call uses only the appropriate types of kernel object identifiers.

Using "local" kernel objects, a calling process may have a purview which, for example, limits it to the calling the process itself. Therefore, in this instance, the calling process can only direct the kernel to perform functions that directly affect only the calling process itself. With this purview and with reference to FIG. 1, the process 150 may direct the kernel 120 (via the kernel interface 152) to perform a function via a local kernel object, but that function can only be one that directly affects the process 150. If the function via the local kernel object attempts to directly affects process 140, then kernel interface 152 will block or prevent the process 150 from making such a call.

In another implementation, the purview of a calling process may be, for example, limited to the calling process itself, any children of that calling process, and the state of the kernel with respect to the calling process and its children. Thus, in this instance, the calling process can only direct the kernel to perform those functions directly affecting the calling process itself its children, or the state of the kernel with respect to the calling process or its children.

With this purview and with reference to FIG. 1, the process 130 may direct the kernel 120 (via the kernel interface 132) to perform a function, but that function can only be one directly affecting the process 130, its child process 140 or the state of the kernel 120 with respect to the processes 130 or 140. If the function directly affects process 150, then kernel interface 132 will block or prevent process 130 from making such a call.

In still another implementation, the purview of a calling process may be, for example, limited to the calling process itself, to initiating or terminating children, and the state of the kernel with respect to the calling process. Therefore, in this instance, the calling process can only instruct the kernel to perform those functions that directly affect the calling process itself while it is executing, its children upon initiation or termination (but not while it is executing), or the state of the kernel with respect to just the calling process.

Thus, in other words, the calling process may directly affect (via a kernel interface call) the state of a child process either before or after the child process executes, but not during the child's execution. The parent process may call to create a child process, which specifies the code in the child process before the child begins execution. The parent process may call to stop a child process, which reclaims the state of the child process after all threads of ceased execution.

With this purview and with reference to FIG. 1, the process 130 may instruct the kernel 120 (via the kernel interface 132) to perform a function, but that function can only be one that directly affects the process 130 itself, spawning or ending its child process 140, or the state of the kernel 120 with respect to the calling process 130. If the function directly affects process 150 or the child process 140 (while it is executing), then kernel interface 132 will block or prevent process 130 from making such a call.

Furthermore, with one or more implementations described, the communication between the calling process and the kernel—via its kernel interface—cannot be redirect to a second process because redirection to a second process would require conversion of "local" kernel objects to "peer" kernel objects. Consequently, the OS can guarantee a dependable execution environment for the child process. This guarantee also prevents an untrusted parent process from snooping on private communication between the child process and the kernel.

With the kernel interfaces (like what is described herein) bounded to the state of the calling process (and its purview), the OS guarantees the integrity of the kernel interface. In addition, the described kernel interfaces may establish a trusted isolation boundary between the parent and child process. The exemplary bounded kernel interface may enforce a model that allows the parent process to limit a child's access to all additional software services (accessed through channels). At the same time, the exemplary bounded kernel interface gives a child process the ability to identify the providers of all software services (accessed through channels) and limit its use of services based on its trust policies.

Methodological Implementation Regarding Kernel Interface Calls

Figure 2:
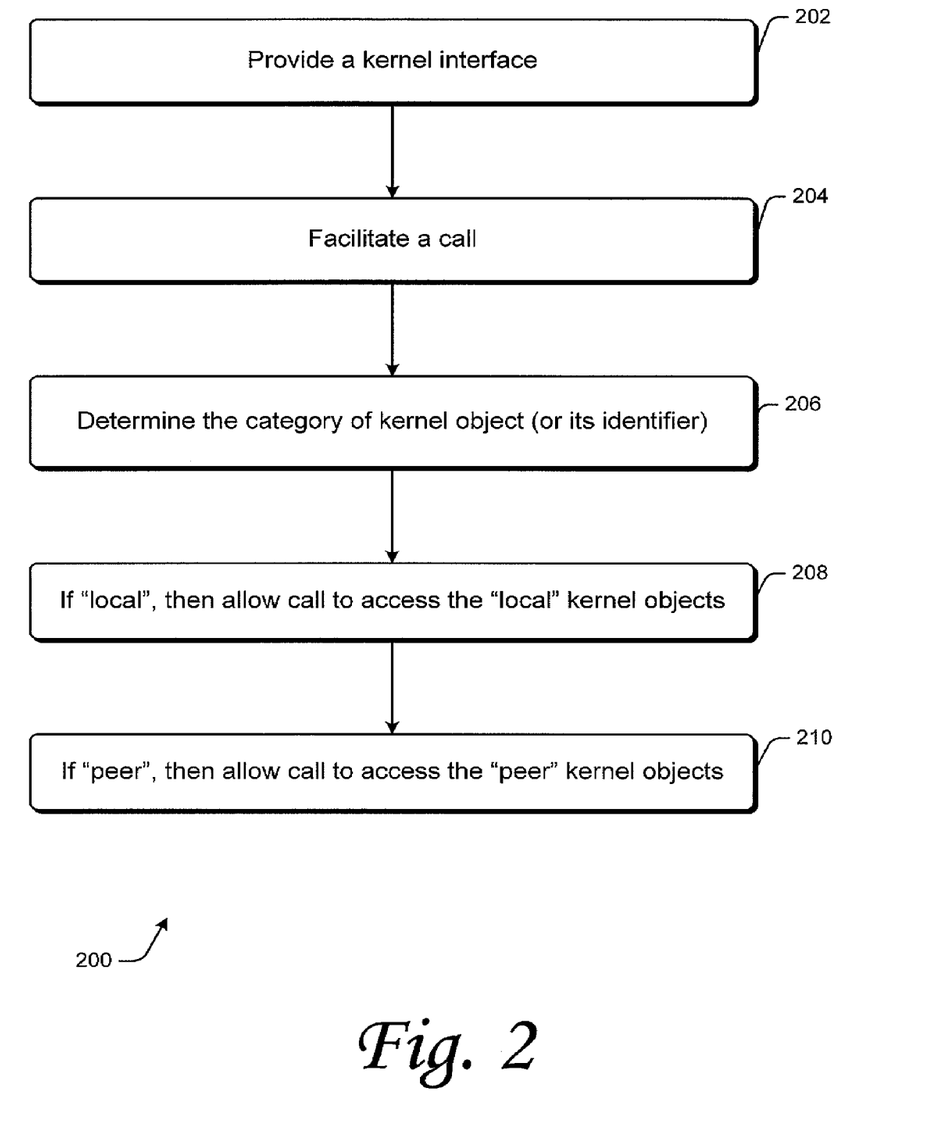
FIG. 2 is a flowchart of another methodological implementation described herein.

FIG. 2 shows method 200 for implementing a safe kernel interface. Method 200 is performed by one or more of the various components depicted in FIG. 1.

At block 202 of FIG. 2, an OS provides a kernel interface configured for executing processes to call the kernel in order to instruct the kernel to perform a function that directly affects the execution of the kernel itself or the execution of the processes. The kernel interface is designed for one or more executing processes to call an operating system's kernel for access to one or more kernel objects.

At block 204, the OS facilitates a calling process (e.g., process 130) to make a call—via the kernel interface—to the kernel. With the call, the calling process seeks to access to one or more kernel objects via the kernel interface and the kernel. In one implementation, the call specifies a categorized kernel-object identifier that identifies one or more called kernel objects.

At block 206, the OS determines whether a categorized kernel-object identifier specified by the call is a member of a designated first category of kernel-object identifiers. The first category here can be the either the "local" or "peer" kernel-object identifiers. So, the second category would be the other identifiers.

With at least one implementation, membership in the categorized lists is mutually exclusive. In other words, an identifier may be member of only one list. Indeed, there is no mechanism (in at least one implementation) for transferring membership amongst categories.

Furthermore, each categorized kernel object is identified by a unique kernel-object identifier. That identifier is formatted differently from the identifiers in the other category and that format is incompatible with the format of the other categories.

At block 208, if the category is determined to be "local", the the OS permits the calling process to access the one or more kernel objects identified by the kernel-object identifier which has been determined to be a member of the designated first category of kernel-object identifiers.

At block 210, if the category is determined to be "peer", the the OS permits the calling process to access the one or more kernel objects identified by the kernel-object identifier which has been determined to be a member of the designated first category of kernel-object identifiers.

Methodological Implementation Regarding Parent-Child Relationship

Figure 3:
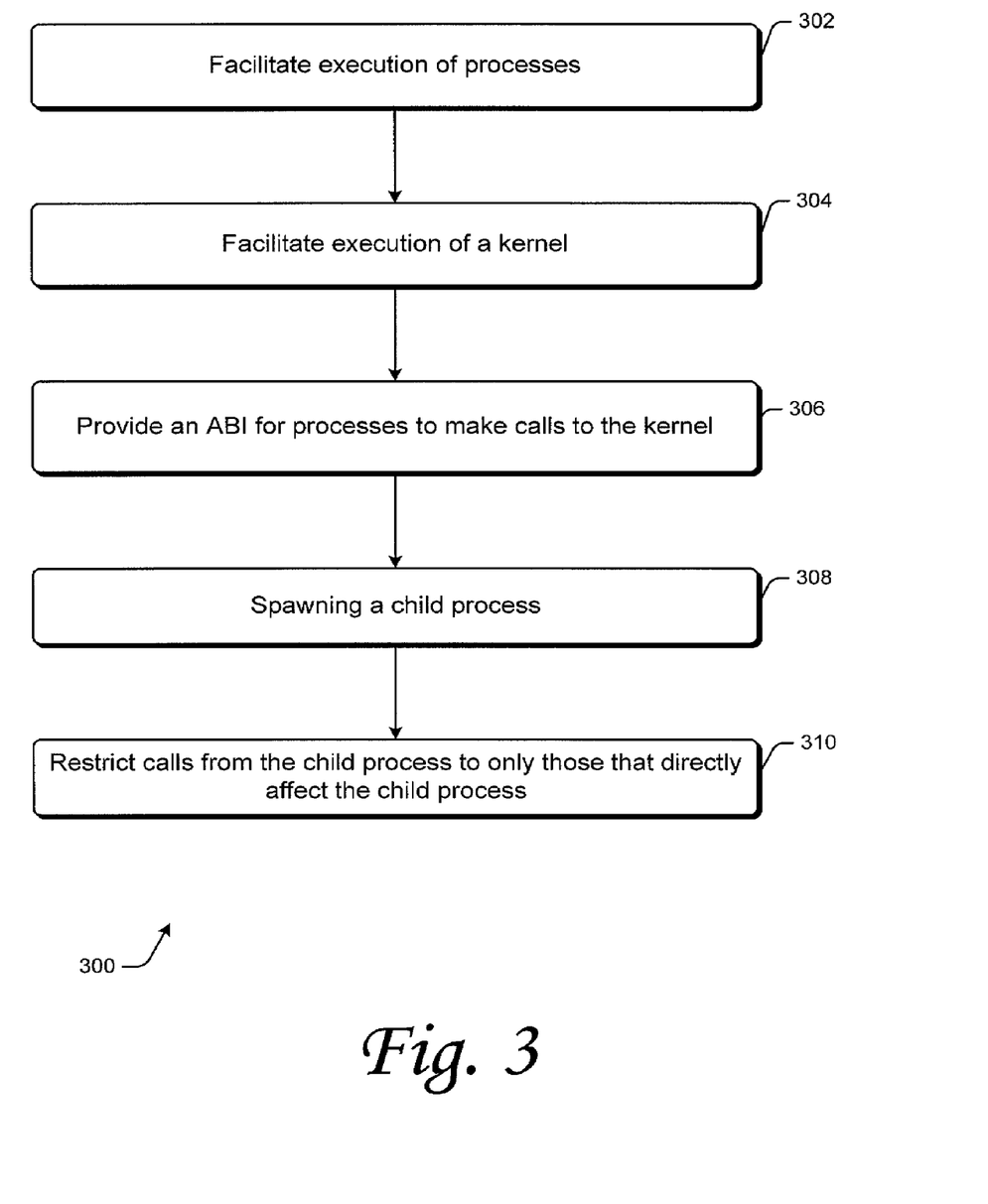
FIG. 3 is a flowchart of another methodological implementation described herein.

FIG. 3 shows another method 300 for implementing process-limited kernel interface, especially with respect to parent-child process relationship. Method 300 is performed by one or more of the various components depicted in FIG. 1.

At block 302 of FIG. 3, an OS facilitates the execution of one or more processes in the context of a computer operating system environment. For example, as depicted in FIG. 1, the processes 130, 140, and 150 run under the OS 112 on the computer 102.

At block 304, the OS facilitates the execution of a kernel in the computer operating system environment. For example, the kernel 120 runs as part of the OS 112 on the computer 102.

At block 306, the OS provides an kernel interface. The kernel interface is configured for the executing processes to call the kernel in order to instruct the kernel to perform a function that directly affects the execution of the kernel itself or the execution of the processes.

At block 308, the OS facilitates a parent process (e.g., process 130) spawning a new child process via a call through the kernel interface to the kernel. When the child is spawned, the call by the parent directs and defines the scope of access of the new child process. In other words, it defines which other process that the child process may communicate with (via inter-process communication channels). Simultaneously, the exemplary bounded kernel interface gives a child process the ability to identify the providers of all software services (accessed through channels) and limit its use of services based on its trust policies. In addition to creating them, a parent process may be allowed to terminate its children.

At block 310, the OS restricts calls—via the kernel interface—from the child process in such a way that the function to be performed by the kernel only directly affects the execution of the child process. Thus, calls by the child do not affect the execution of any of the other executing processes.

With regard to block 310, this is an example of just one purview of the child process. In other implementations, the purview may be extended and redefined. Examples of such purviews are discussed above in the section titled "Exemplary Kernel Interface."

Conclusion

The term "software process" or "processes" is used herein for convenience and is not intended to limit the scope of this concept. Indeed, this concept can be implemented in software, hardware, firmware, or a combination thereof.

The techniques described herein may be implemented in many tangible ways, including, but not limited to, program modules, i.e., software, hardware, firmware, or a combination thereof. One or more implementations described herein may be implemented via many well-known computing systems, environments, and/or configurations that are suitable for use. Examples of such include, but are not limited to: personal computers (PCs), server computers, hand-held or laptop devices, multiprocessor systems, microprocessor-based systems, programmable consumer electronics, wireless phones and equipment, general- and special-purpose appliances, commercial electronics, application-specific integrated circuits (ASICs), network PCs, thin clients, thick clients, set-top boxes, minicomputers, mainframe computers, distributed computing environments including any of the above systems or devices, and the like.

Although one or more of the above-described implementations were described in language specific to structural features and/or methodological steps, it is to be understood that other implementations may be practiced without the specific exemplary features or steps described herein. Rather, the specific exemplary features and steps are disclosed as preferred forms of one or more implementations. In some instances, well-known features may have been omitted or simplified to clarify the description of the exemplary implementations. Furthermore, for ease of understanding, certain method steps are delineated as separate steps; however, the steps delineated separately should not be construed necessarily as order dependent in their performance.

Appendix A

In general usage, the exemplary kernel interface is accessed through an API library. In this exemplary kernel interface, the executable instructions of the process are verified to insure that only trusted code in the API library can invoke the methods marked with the unsafe attribute. Each struct in the exemplary kernel interface represents a unique type of kernel object. Custom attribute tags below mark local kernel objects, [LocalKernelObject] and peer kernel objects, [PeerKernelObject]. The [LocalKernelObject] and [PeerKernelObject] tags are used to inform compilers and other tools that validate the correct usage of local and peer kernel objects and kernel interface entry points.

```
namespace Kernel.V1.processes {
    [LocalKernelObject]
    struct ProcessHandle {
        static unsafe bool Create(char *args, int *argLengths, int argCount, out ProcessHandle
             handle);
        static unsafe bool Create(char *args, int *argLengths, int argCount, ExtensionContract.Exp
             opt(ExHeap) * exp, out ProcessHandle handle);
        static unsafe bool Create(char *args, int *argLengths, int argcount, char *role, int
             rolelength, ExtensionContract.Exp opt(ExHeap) * exp, out ProcessHandle handle);
        static void Dispose(ProcessHandle handle);
        static bool Start(ProcessHandle handle);
        static void Join(ProcessHandle handle, out bool started);
        static bool Join(ProcessHandle handle, TimeSpan timeout, out bool started);
        static bool Join(ProcessHandle handle, DateTime stop, out bool started);
        static bool Suspend(ProcessHandle handla, bool racursive);
        static bool Resume(ProcessHandle handle, bool recursive);
        static void Stop(ProcessHandle handle, int exitcode);
        static void SuspendBarrier( );
        static int GetProcessId(ProcessHandle handle);
        static int GetExitCode(ProcessHandle handle);
    }
}
namespace Kernel.V1.Services {
    [LocalKernelObject]
    struct DebugService {
        static unsafe void PrintBegin(out char * buffer, out int length);
        static unsafe void PrintComplete(char * buffer, int used);
        static unsafe void Print(char * buffer);
        static unsafe void Print(char * buffer, int length);
```

```
    static void Break( );
    static bool IsDebuggerPresent( );
}
[LocalKernelObject]
struct DeviceService {
    static unsafe uint GetPnpSignature(char * output, uint maxout);
    static bool GetpciConfig(out ushort pciAddressPort, out ushort pciDataPort, out ushort
        identifier);
    static int GetIrqCount(byte line);
    static uint GetDynamicIoRangeCount( );
    static bool GetDynamicIoPortRange(uint range, out ushort port, out ushort size, out bool
        readable, out bool writable);
    static unsafe bool GetDynamicIoMemoryRange(uint range, out byte * data, out uint size, out
        bool readable, out bool writeble);
    static bool GetDynamicIoIrqRange(uint range, out byte line, out byte size);
    static bool GetDynamicIoDmaRange(uint range, out byte channel, out byte size);
    static uint GetFixedIoRangeCount( );
    static bool GetFixedIoPortRange(uint range, out ushort port, out ushort size, out bool
    readable, out bool writable);
    static unsafe bool GetFixedIoMemoryRange(uint range, out byte * data, out uint size, out bool
        readable, out bool writable);
    static bool GetFixedIoIrqRange(uint range, out byte line, out byte size);
    static bool GetFixedIoDmaRange(uint range, out byte channel, out byte size);
}
[PeerKernelObject]
struct EndpointCore {
    static EndpointCore* opt(exHeap)! Allocate(uint size, SystemType st);
    static void Free(EndpointCore* opt(ExHeap) endpoint);
    static void Connect(EndpointCore* opt(ExHeap)! imp, EndpointCore* opt(ExHeap)! exp);
    static void TransfersBlockOwnerahip(Allocation* ptr, ref EndpointCore target);
    static void TransferContentOwnership(ref EndpointCore transferee, ref EndpointCore target);
    static uint GetPrincipal(EndpointCore* opt(ExHeap) endpoint, char *outprincipal, uint maxout);
}
[PeerKernelObject]
struct ExchangeHeapService {
    static unsafe UIntPtr GetData(Allocation *allocation);
    static unsafe UIntPtr GetSize(Allocation *allocation);
    static unsafe UIntPtr GetType(Allocation *allocation);
    static unsafe Allocation * Allocate(UIntPtr size, SystemType type, uint alignment);
    static unsafe void Free(Allocation *allocation);
    static unsafe Allocation * Share(Allocation *allocation, UIntPtr startOffset, UIntPtr
        endOffset);
    static unsafe Allocation * Split(Allocation *allocation UIntPtr offset);
}
[LocalKernelObject]
struct PageTableService {
    static unsafe uint * GetPageTable( );
    static UIntPtr GetPageCount( );
    static uint GetProceesTag( );
    static UIntPtr Allocate(UIntPtr bytes, UIntPtr reserve, UIntptr alignment);
    static UIntPtr AllocateBelow(UIntPtr limit, UIntPtr bytes, UIntPtr alignment);
    static UIntPtr AllocateExtend(UIntPtr addr, UIntPtr bytes);
    static void Free(UIntPtr addr, UIntPtr bytes);
    static bool Query(UIntPtr queryAddr, out UIntPtr regionAddr, out UIntptr regionSize);
}
[LocalKernelObject]
struct ProcessService {
    static void Stop(int exitCode);
    static DateTime GetUpTime( );
    static DateTime GetUtcTime( );
    static long GetCycleCount( );
    static long GetCyclesPerSecond( );
    static ushort GetCurrentProcessId( );
    static int GetStartupEndpointCount( );
    static unsafe ExtensionContract.Exp opt(ExHeap) * GetStartupEndpoint(int arg);
    static int GetStartupArgCount( );
    static unsafe int GetStartupArg(int arg, char * output, int maxout);
    static unsafe void GetTracingHeaders(out LogEntry * logBegin, out LogEntry *logLimit, out
        LogEntry **logHead, out byte *txtBegin, out byte *txtLimit, out byte **txtHead);
}
[LocalKernelObject]
struct StackService {
    static void GetUnlinkStackRange(out ulong unlinkBegin, out ulong unlinkLimit);
    static void LinkStack0( );
    static void LinkStack4( );
    static void LinkStack8( );
    static void LinkStack12( );
    static void LinkStack16( );
    static void LinkStack20( );
    static void LinkStack24( );
```

```
      static void LinkStack28( );
      static void LinkStack32( );
      static void LinkStack36( );
      static void LinkStack40( );
      static void LinkStack44( );
      static void LinkStack48( );
      static void LinkStack52( );
      static void LinkStack56( );
      static void LinkStack60( );
      static void LinkStack64( );
    }
}
namespace Kernel.V1.Threads {
  [LocalKernelObject]
  struct AutoResetEventHandle : SyncHandle {
    static bool Create(bool initialState, out AutoResetEventHandle handle);
    static void Dispose(AutoResetEventHandle handle);
    static bool Reset(AutoResetEventHandle handle);
    static bool Set(AutoResetEventHandle handle);
    static bool SetNoGC(AutoResetEventHandle handle);
  }
  [LocalKernelObject]
  struct InterruptHandle : SyncHandle {
    static bool Create(byte irq, out InterruptHandle handle);
    static bool Dispoae(InterruptHandle handle);
    static bool Ack(InterruptHandle handle);
  }
  [LocalKernelObject]
  struct ManualResetEventHandle : SyncHandle {
    static bool Create(bool initialState, out ManualResetEventHandle handle);
    static void Dispose(ManualResetEventHandle handle);
    static bool Reset(ManualResetEventHandle handle);
    static bool Set(ManualResetEventHandle handle);
  }
  [LocalKernelObject]
  struct MutexHandle : SyncHandle {
    static bool Create(bool initiallyOwned, out MutexHandle handle);
    static void Dispose(MutexHandle handle);
    static void Release(MutexHandle handle);
  }
  [LocalKernelObject]
  struct SyncHandle {
    static bool WaitOne(SyncHandle handle);
    static bool WaitOne(SyncHandle handle, TimeSpan timeout);
    static bool WaitOne(SyncHandle handle, DateTime stop);
    static bool WaitOneNoGC(SyncHandle handle);
    static int WaitAny(SyncHandle * handles, int handleCount);
    static int WaitAny(SyncHandle * handles, int handleCount, TimeSpan timeout);
    static int WaitAny(SyncHandle * handles, int handleCount, DateTime stop);
  }
  [LocalKernelObject]
  struct ThreadHandle {
    static bool Create(int threadIndex, out ThreadHandle thread);
    static void Dispose(ThreadHandle thread);
    static void Start(ThreadHandle thread);
    static ThreadState GetThreadState(ThreadHandle thread);
    static TimeSpan GetExecutionTime(ThreadHandle thread);
    static bool Join(ThreadHandle thread);
    static bool Join(ThreadHandle thread, TimeSpan timeout);
    static bool Join(ThreadHandle thread, DateTime stop);
    static ThreadHandle CurrentThread( );
    static UIntPtr GetThreadLocalValue( );
    static void SetThreadLocalValue(UIntPtr value);
    static void Sleep(TimeSpan timeout);
    static void Sleep(DateTime stop);
    static void Yield( );
    static void SpinWait(int iterations);
  }
}
namespace Kernel.V1.Types {
  [PeerKernelObject]
  struct SystemType {
    static SystemType RootSystemType( );
    static SystemType Register(long lowerHash, long upperHash, SystemType parent);
    static bool IsSubtype(systemType child, SystemType parent);
    static unsafe bool IsSubtype(Allocation* childData, SystemType parent);
    static bool IsNull(SystemType st);
  }
}
```

The invention claimed is:

1. One or more processor-readable media comprising processor-executable instructions that, when executed by a processor, perform operations comprising:
   providing a kernel interface to call an operating system's kernel for access to one or more kernel objects of an executing process;
   facilitating a call, via the kernel interface, from the executing process to the kernel for access to the one or more kernel objects of the executing process, the call specifying a kernel-object identifier that identifies a called kernel object, the kernel-object identifier being an exclusive member of one of a plurality of designated categories of kernel-object identifiers, wherein each designated category of kernel-object identifiers has a format that is different from and incompatible with one or more formats of one or more other designated categories of kernel-object identifiers;
   determining whether the kernel-object identifier specified by the call identifies a local kernel objects that is for exclusive use by the executing process or identifies a peer kernel object that is for use by the executing process and one or more other executing processes;
   when the kernel-object identifier identifies the local kernel object, permitting the executing process to access the local kernel object via the call; and
   when the kernel-object identifier identifies the peer kernel object, blocking the call to prevent the executing process from accessing the peer kernel object.

2. One or more media as recited in claim 1, further comprising facilitating, via the kernel interface, an additional call that initiates or terminates a child process of the executing process.

3. One or more media as recited in claim 1, wherein the local kernel object is owned by the executing process.

4. One or more media as recited in claim 1, wherein the peer kernel objects is owned by the executing process or the one or more other executing processes.

5. One or more media as recited in claim 1, further comprising preventing conversion of a kernel-object identifier for the local kernel object into a kernel-object identifier for the peer kernel object.

6. One or more media as recited in claim 1, wherein the call comprises a request for the kernel to perform a function upon one or more processes via one or more kernel objects.

7. An operating system comprising one or more media as recited in claim 1.

8. One or more processor-readable storage media comprising processor-executable instructions that, when executed by a processor, perform operations comprising:
   recognizing one or more kernel objects of a subject process prior to and without execution of the subject process;
   categorizing one or more of the recognized kernel objects into at least two categories based upon access permission functions of a kernel interface designated to act on a recognized kernel object, the first category comprising local kernel objects that are owned by the subject process and are for exclusive use by the subject process, and the second category comprising peer kernel objects that are owned and for use by the subject process and one or more other processes, wherein each kernel object is categorized into one of a plurality of mutually exclusive categories such that a format of an identifier for a kernel object in each kernel object category is different from and incompatible with formats of identifiers for kernel objects in one or more other kernel object categories;
   when a recognized kernel object is categorized into the first category, permitting the subject process to access the recognized kernel object; and
   when the recognized kernel object is categorized into the second category, blocking the subject process from accessing the recognized kernel object.

9. One or more storage media as recited in claim 8, wherein each categorized kernel object is identified by a unique identifier.

10. An operating system comprising one or more storage media as recited in claim 8.

11. A method implemented by executable instructions stored on one or more processor-readable media, the method comprising:
   facilitating execution of one or more processes in a context of a computer operating system environment;
   facilitating execution of a kernel in the computer operating system environment;
   providing a kernel interface for the one or more executing processes to call the kernel, wherein the call directs the kernel to perform a function that directly affects the execution of the kernel or the execution of the one or more processes;
   facilitating a spawning call, via the kernel interface, from a calling process to the kernel, wherein the spawning call directs the kernel to create a new child process which is permitted to communicate with only other processes that the calling process specifies when the calling process makes the spawning call; and
   restricting calls, via the kernel interface, from the calling process from directly affecting the child process while the child process is executing.

12. The method as recited in claim 11 further comprising:
   facilitating a call, via the kernel interface, from the child process to the kernel;
   permitting the function performed by the kernel in response to the call to directly affect the execution of the child process, but not the execution of any of the other one or more executing processes.

13. The method as recited in claim 11 further comprising:
   facilitating a call, via the kernel interface, from the child process to the kernel; and
   permitting the function performed by the kernel in response to the call to directly affect either the execution of the child process or state of the kernel relative to the child process, but not the execution of any of the other one or more executing processes.

14. The method as recited in claim 11 further comprising:
   facilitating a call, via the kernel interface, from the calling process to the kernel; and
   permitting the function performed by the kernel in response to the call to directly affect the execution of the calling process, but not the execution of any of the other one or more executing processes.

* * * * *